United States Patent [19]
Pacion

[11] 3,896,554
[45] July 29, 1975

[54] HOLDER FOR RULES AND SIMILAR MEASURING INSTRUMENTS
[76] Inventor: Edwin M. Pacion, 2518 N. 22nd Ave., Phoenix, Ariz. 85009
[22] Filed: June 3, 1974
[21] Appl. No.: 475,776

[52] U.S. Cl................................ 33/107; 33/107 R
[51] Int. Cl.² ...................... G01B 3/04; B43L 7/00
[58] Field of Search............................. 33/107, 111

[56] References Cited
UNITED STATES PATENTS

| 332,958 | 12/1885 | Smith................................ 33/107 R |
| 962,399 | 6/1910 | Brigham............................ 33/107 R |
| 1,438,617 | 12/1922 | Starrett............................. 33/107 R |

FOREIGN PATENTS OR APPLICATIONS

| 366,978 | 3/1963 | Switzerland....................... 33/107 R |
| 17,872 | 1912 | United Kingdom............... 33/107 R |

Primary Examiner—Harry N. Haroian
Attorney, Agent, or Firm—Gregory J. Nelson

[57] ABSTRACT

A holder for interchangeably securing conventional rules or scales is disclosed. The holder is elongated and has two legs oriented in a general inverted V configuration with a handle portion provided at the apex. The rules are received in an axial slot defined by a flange associated at each leg. Retainer means assist in securing the rules in place. Access slots are provided in the flange to allow the user to insert an appropriate tool to remove the rule from the holder.

6 Claims, 5 Drawing Figures

HOLDER FOR RULES AND SIMILAR MEASURING INSTRUMENTS

The present invention relates to an improved rule or scale holder and, more particularly, relates to a device for interchangeably securing conventional steel rules, scales and similar measuring instruments.

It is known that draftsmen, sheet metal workers, engineers, architects and similar craftsmen utilize measuring instruments which are provided with various measuring scales as required by the nature of the work. For example, a sheet metal worker may require a scale graduated in metric units for one job and then will subsequently require a scale graduated in English units for another. Similarly, draftsmen and architects require variously graduated or scaled rules when preparing blueprints and plans. Therefore, it is often necessary for the engineer and craftsman to have a set of various graduated rules at his disposal. The term "rule" or "scale" as used herein generally refers to elongated measuring instruments having a generally flat surface with appropriate graduations and a relatively thin cross-section.

A conventional flat rule is sometimes difficult to manipulate as it is inconvenient and difficult to pick up from a flat surface or drawing. Also, the conventional rules often used are easily misplaced or lost. In an attempt to provide a more convenient measuring instrument, it is common for engineers and architects to use a generally triangular scale, having variously etched or engraved units along the faces of the scale.

Another approach to the problem of providing convenient rules is to provide a base of some type for the reception of the scales and rules. Generally, the scales are attached to the base by means of screws or keyways to permit interchangeability. The use of such devices require that the rules be specially adapted to be accommodated on the base.

In an effort to solve the problem and avoid the requirement of specially fabricated rules, it has been suggested to provide a central base having projecting arms which carry elongated slots. The slots house suitable retaining means to frictionally engage a rule. For example, a rubber insert is secured in the slot and the rule is frictionally received in the insert. The disadvantage of this type of device is that the insert eventually wears and the rule easily becomes dislodged with use.

From the foregoing, it becomes apparent that there is a need for a scale holder that will interchangeably accommodate a variety of conventional rules and which is adapted for convenient use. The need for such a device becomes even more apparent when one considers the general transition in the United States and other countries to the metric system, so that even a wider variety of scales will be required to be used by engineers, architects and draftsmen.

The present invention contemplates a convenient holder for use by engineers, architects and craftsmen for interchangeably securing conventional standard rules of varying width and length. The device generally comprises an elongated body member having a pair of projecting legs spaced relative to one another at approximately 60° to 80° on a general inverted V shape. The upper portion of the base at the apex of the V is provided with a rounded rib for convenient manipulation by the user. The rules to be secured are retained against the outer edges of the legs beneath axially extending flanges which run along the side of the holder. Slots are provided at intervals in the flanges to allow an object to be inserted against the upper edge of the rule so that the rule may be removed from the holder. Spring retainers are provided at intervals along the holder to assist in securing the rule in place. The device can be made in various lengths to accommodate varying lengths of rules.

Other objects and advantages of the present invention will become apparent from the claims, specification and drawings, in which:

Figure 3:
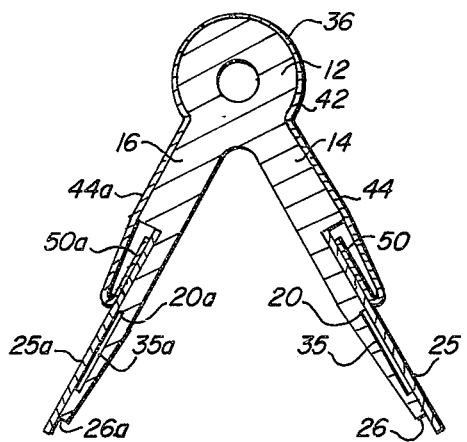
FIG. 3 is a sectional view taken along the line 3—3 of FIG. 2.
Figure 4:
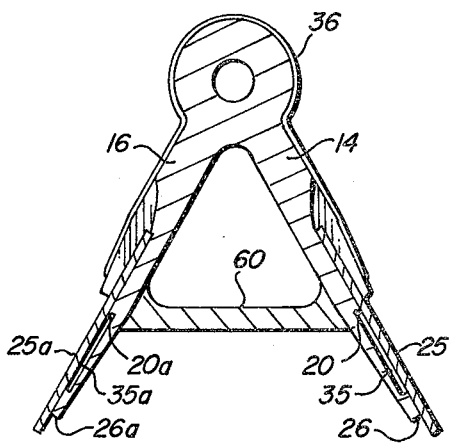
FIG. 4 is a sectional view taken along the line 4—4 of FIG. 2.

Referring now to the drawings, the scale holder of the present invention is generally designated by the numeral 10. The holder 10 includes an upper axially extending rib member 12. Leg members 14 and 16 project from rib 12 in a general inverted V configuration with the rib 12 at the apex of the legs. As seen in FIGS. 3 and 4, legs 14 and 16 are preferably angularly disposed relative to one another at approximately from 60° to 80°. Each of the legs is similarly formed, having a substantially flat mounting surface 20 on which the scale to be secured is supported. The upper portion of each of the legs 14 and 16 is formed having an axially extending flange 22 co-extensive with the leg members. A slot 24 is defined between flange 22 and face 20. Slot 24 has a width corresponding to the width of most conventional rules. Conventional rules 25 and 25a are shown in place associated with the respective legs 14 and 16. The distance from the inner end of slot 24 to the terminal end 26 of the leg is selected so that when scale 25 is engaged in the holder, it will project slightly beyond the terminal end 26 of the legs. This is best seen in FIGS. 3 and 4, and this feature will be discussed in greater detail hereinafter. Flange surface 28 and leg surface 30 are preferably beveled for appearance and to avoid presenting any sharp surfaces or edges to the user. In order to minimize bending and warpage, a relief slot 35 and 35a is provided in the surface of each of the legs 14 and 16. Throughout the specification and drawings, similar elements are designated by corresponding numerals with a letter *a* being appended for differentiation.

Figure 1:
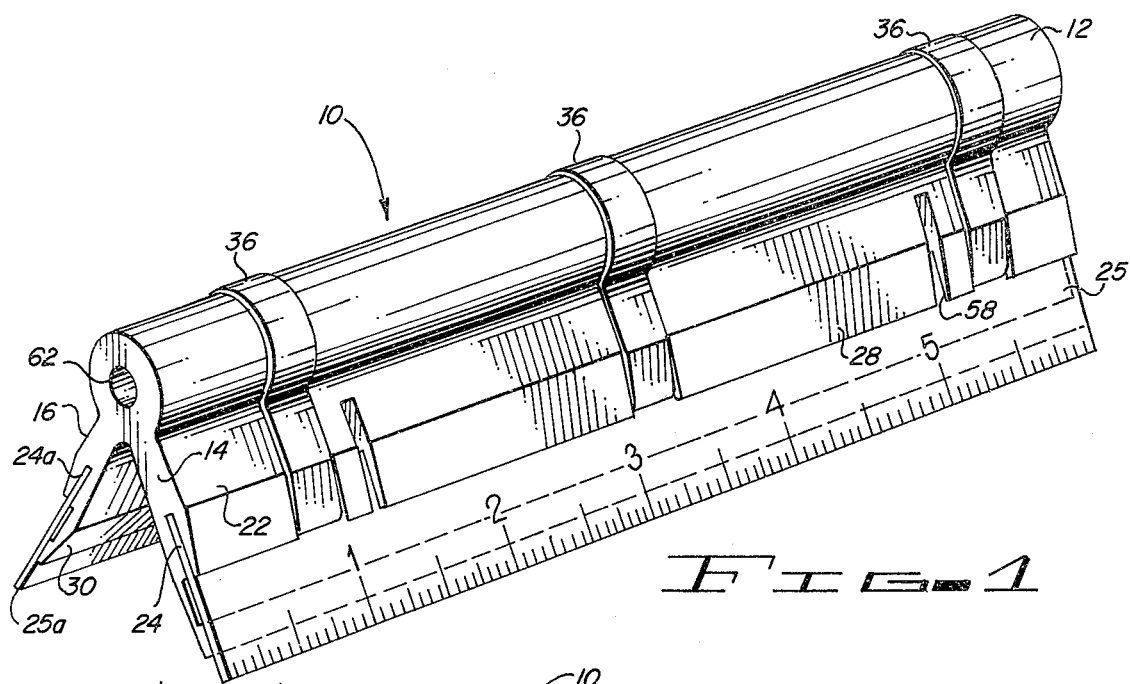
FIG. 1 is a perspective view illustrating the scale holder in the present invention with several rules secured in place.
Figure 2:
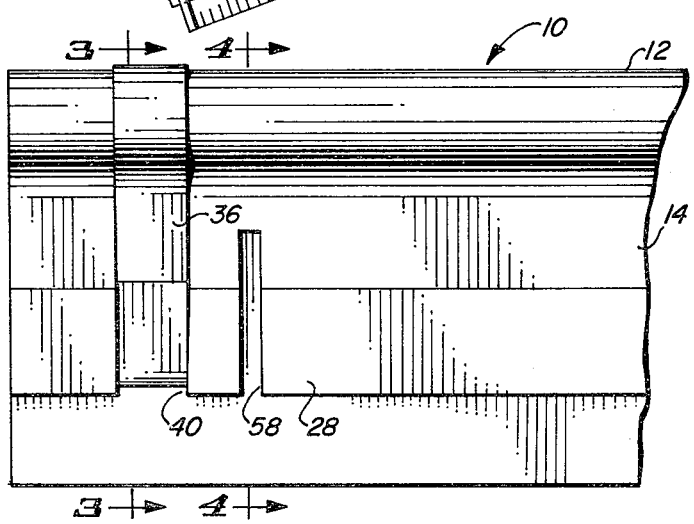
FIG. 2 is a broken side elevational view of the scale holder of the present invention with a rule in place.

To further assist in securing the rule in place in the holder, retainers 36 are provided at intervals along the scale. Flanges 22 and 22a are provided with access openings 40 at intervals along the length of the holder to accept retainers 36. For example, three are shown in FIG. 1 as being typical.

Figure 5:
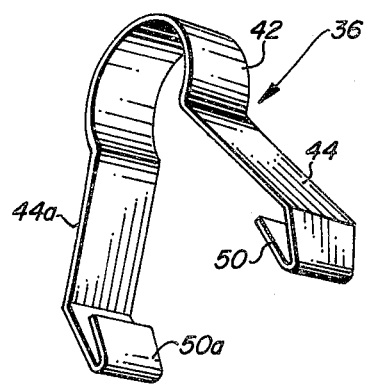
FIG. 5 is a detail view of the spring retainer.

As best seen in FIG. 5, retainer 36 is formed from a continuous strip of resilient material, such as spring steel or plastic, having approximately the same width as opening 40. The upper end of retainer 36 is rounded at 42 to conform to rib 12 of the holder. Retaining arms 44 and 44a are adapted to extend along the upper portion of legs 14 and 16 of the holder. The lower ends of arms 44 and 44a are inwardly bent at tabs 50 and 50a. Tabs 50 and 50a correspond to openings 40 in the flanges and, when engaged about the holder, will exert a spring force against the surface of the rule, securing the rule in place. Alternatively, the retaining force could be applied by other means. For example, permanent magnets could be embedded in the mounting surfaces 35 and 35a at spaced locations to exert a retaining force, securing the metal rule in place.

The present invention also has provision to facilitate convenient removal of a rule. To this end, slots 58 are provided in flange 22 at spaced apart locations so that the upper edge of rule 25 is exposed in the slot when the rule is in place. This permits the user to insert an object into the slot and engage the upper edge of the rule 25 and disengage the rule from the holder.

As seen in FIG. 4, brace member 60 is provided and extends between interior sides of legs 14 and 16 to give rigidity and strength to the holder and prevent flexing of the rule. Brace member 60 could be formed as one continuous piece or as several pieces placed at selected intervals.

The holder 10 of the present invention is preferably made from aluminum or plastic in an extrusion process. Upper rib 12 can be solid or, in order to conserve weight and material, may be provided with an axial opening 62. It will also be obvious that upper rib 12 could be eliminated and the configuration would be that of a general V. Also, it is within the scope of the present invention to provide a handle other than the axial rib 12. For example, the handle portion could take the form of a tab or flange projecting from the holder.

The present invention will be better understood from the following description of use. For example, a draftsman using the holder 10 of the present invention for transferring measurements from a drawing and desiring to use both metric and English scales, would isnert a first rule 25 in slot 24 formed in leg 14 beneath flange 22 with the appropriate scale graduations appearing along the exposed lower edge of the rule. Rule 25 is inserted by simply sliding the upper edge of the rule into the slot 24 and beneath retainer member 36. Tab 50 on retainer 36 serves to tightly secure the rule in place against the leg of the holder. Similarly, second rule 25a would be placed in position against leg 16 of the device and inserted in slot 24a beneath tab 50a. As pointed out above, both of the rules in this position will project slightly below the lower terminal edges 26 and 26a of the legs 14 and 16 so that the lower edges of the rules, themselves, rest on the workpiece or drawing. In this way, measurements can be directly made. Rib 12 of the holder serves as a handle and facilitates use of the device allowing the user to quickly and easily pick up and manipulate the scales as required. If it is desired to change or reverse the rule, the user would simply insert his fingernail or sharp object into one of the slots 58 or 58a exerting a slight downward force to dislodge the rule from the slot and retainers.

The holder of the present invention can be made in varying lengths to accept standard lengths of scales. It will be more convenient to have the length of holder generally correspond to the length of the rule, however it will be noted that the holder can be used to secure rules having a length exceeding or less than the holder, itself.

It will also be noted that the present invention can be easily manufactured and is adapted to a wide variety of applications. The present invention permits convenient changing of the rules and is adapted to accept most conventional rules. No special rules are required and the rules in place are in direct contact with the drawing or workpiece. A further advantage of the invention resides in the orientation of the rules when secured in place. The rules are in a position with the graduations being easily visible and readable by the user.

It will be obvious to those skilled in the art to make various changes and modifications to the preferred embodiment of the invention shown herein. To the extent that these changes and modifications and alterations do not depart from the spirit and scope of the appended claims, they are intended to be encompassed therein.

I claim:

1. A holder for detachably securing a longitudinally elongate generally flat measuring rule having opposite sides, at least one of said sides carrying indicia along a longitudinal edge, said holder comprising:
   a. a generally elongate body member having a pair of legs laterally projecting from said body defining an acute angle therebetween, at least one of said legs defining a substantially flat mounting surface extending substantially the length of said body, and said surface having a lateral width substantially corresponding to the width of the rule to be secured;
   b. a flange projecting from said body and partially overlying said mounting surface and defining a rule receiving slot therewith, said slot being of a lateral depth to expose a major portion of the indicia carrying side of the rule when said rule is inserted in the slot; and
   c. spring retaining means adapted to engage said body and the exposed indicia carrying sides of the rule to exert a retaining force thereagainst whereby rule can be inserted in said slot and in contact with said retaining means and supported on said mounting surface against undesired flexure.

2. The holder of claim 1, further including at least one access slot in each of said flanges to permit insertion of means for removing said rule.

3. The holder of claim 1, further including handle means associated with said body member.

4. The holder of claim 3, wherein said handle means comprise an elongated rib member.

5. The holder of claim 4, wherein said body member and legs are a unitary structure and are formed as an extrusion.

6. The holder of claim 5, wherein said retaining means are integrally formed having a cross-sectional shape generally conforming to said body member and include tab means for exerting an inward retaining force against the rule.

* * * * *